US009026921B2

(12) United States Patent
Shi et al.

(10) Patent No.: US 9,026,921 B2
(45) Date of Patent: May 5, 2015

(54) INTELLIGENT WORKSPACE

(75) Inventors: Shiheng Shi, Shanghai (CN); Qi Li, Shanghai (CN); Weiliang Le, Vancouver (CA); Wei Xue, Shanghai (CN); Yulei Zhang, Shanghai (CN); Yuanfei Cai, Shanghai (CN)

(73) Assignee: Business Objects Software Limited (IE)

( * ) Notice: Subject to any disclaimer, the term of this patent is extended or adjusted under 35 U.S.C. 154(b) by 484 days.

(21) Appl. No.: 12/885,562

(22) Filed: Sep. 19, 2010

(65) Prior Publication Data

US 2012/0054639 A1 Mar. 1, 2012

(30) Foreign Application Priority Data

Aug. 27, 2010 (CN) .......................... 2010 1 0264259

(51) Int. Cl.
*G06F 3/00* (2006.01)
*G06Q 10/10* (2012.01)
*H04L 29/06* (2006.01)

(52) U.S. Cl.
CPC ............ *G06Q 10/103* (2013.01); *H04L 65/403* (2013.01)

(58) Field of Classification Search
CPC ............................ H04L 65/403; G06Q 10/103
USPC .................................................. 715/753, 751
See application file for complete search history.

(56) References Cited

U.S. PATENT DOCUMENTS

| 5,072,412 A | * | 12/1991 | Henderson et al. ........... 715/804 |
| 2009/0222741 A1 | * | 9/2009 | Shaw et al. .................... 715/753 |
| 2011/0010324 A1 | * | 1/2011 | Bolivar et al. ................. 706/46 |

* cited by examiner

*Primary Examiner* — Andrey Belousov
(74) *Attorney, Agent, or Firm* — Horizon IP Pte. Ltd.

(57) ABSTRACT

Described herein is a technology for collaboration. In accordance with some implementations, the workspace tool is adapted to cooperate with an electronic communication system. Electronic communications related to the workspace tool are stored in a repository and are associated with respective workspaces. The workspace tool allows participants of a workspace to access all information related to the workspace.

17 Claims, 13 Drawing Sheets

INTELLIGENT WORKSPACE

TECHNICAL FIELD

The present disclosure relates generally to an intelligent tool and method for organizing information related to a topic.

BACKGROUND

Various tools exist to facilitate communication or collaboration among users. One such tool, for example, is an Electronic mail (email) system. Email systems enable users to easily communicate with each other.

Users may collaborate on a topic, such as a project or making a decision. In such scenarios, a user may create an email thread to initiate a collaboration. For example, a colleague may initiate a discussion related to a topic or project with other colleagues. The email thread may include one or more attachments which the initiator desires to share with other users, which will be part of the collaboration group. The attachments may be any type of file. For example, attachments may be a text or document, report, picture and/or video.

During the collaborative process, information related to the topic is exchanged between users of the collaboration group. Such information includes, for example, email threads, meetings, tasks and attachments. When an email thread has been replied to by multiple users or multiple times, the context of the original email may easily be lost or obscured. The user group may be dynamic over the life of the collaboration. For example, some users may be removed from or added to the collaborative group. Since information may be created by different users, not all users may have the same information and/or context. This may hinder the effectiveness of the collaboration.

Therefore, it is desirable to improve the efficiency and effectiveness of the collaboration process.

SUMMARY

A method of collaborating on a topic is disclosed. The method includes providing a workspace system for maintaining one or more workspaces. An electronic communication is generated and a first workspace in the workspace system is selected. The first workspace is related to a first topic for collaboration by a first group of participants. The method also includes sending the electronic communication to the first group of participants. The electronic communication associated with the first workspace is stored in the workspace system.

A workspace system is also described herein. The workspace system includes a workspace client located at a client device and a workspace server. The workspace client includes a workspace user interface for accessing the workspace system and a workspace builder module for creating a new workspace. On the other hand, the workspace server includes a workspace repository for storing electronic communications associated with the workspaces and a workspace index engine for providing information to associate electronic communications to their respective workspaces.

In yet another embodiment, a computer usable medium is presented. The computer usable medium has a computer readable program code tangibly embodied therein. The computer readable program is adapted to be executed by a processor to implement a method for collaborating on a topic. The computer readable program cooperates with an electronic communication system, maintains one or more workspaces and stores electronic communications related workspaces. An electronic communication is associated with its respective workspace.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts.

FIGS. 11a-b show an exemplary embodiment of a user interface.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A framework or application of a workspace for organizing information related to a topic is described herein. The workspace framework may be used, for example, to organize all information related to a topic. The information, for example, may include emails, appointments, tasks and attachments, such as reports, pictures, documents, or any other type of information related to the topic. The workspace framework provides stakeholders with trust content and context to improve efficiency of the collaborative process.

In one implementation, the present framework can organize different workspaces for different topics. The workspace framework may suggest a user related workspace to further improve efficiency of the collaborative process.

In another implementation, the workspace framework can be implemented as part of the communication application. This enables a user to access information from within the communication application.

Figure 1:
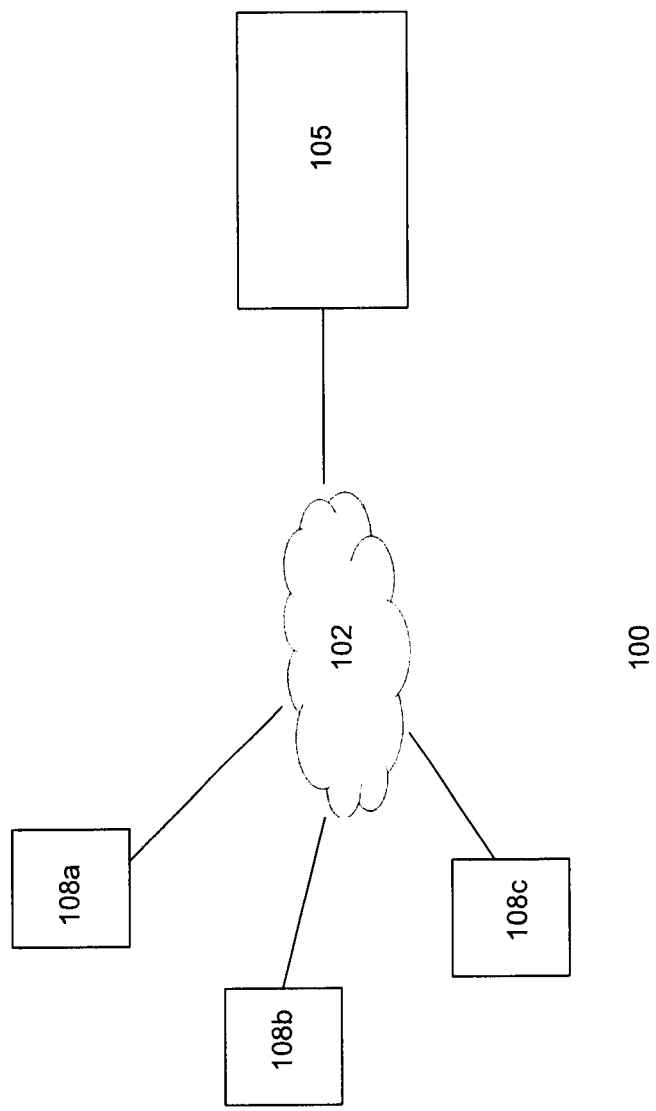
FIG. 1 shows an embodiment of an environment.

FIG. 1 shows a block diagram of an exemplary environment 100. The environment, for example, facilitates collaboration between users. The environment may have a client/server architecture. For example, the environment may be a distributed client/server architecture. In one embodiment, the environment includes one or more clients 108a-c and a server 105 communicatively coupled via a communication network 102. Clients 108a-c may access the server 105 to store information and/or retrieve information maintained on the server. Furthermore, the server may facilitate communication between clients.

The communication network, for example, may be a local area network (LAN) which interconnects different devices, such as the clients and server. Other types of networks may also be useful. The devices may be coupled via the network by wireless and/or wired connections.

The server, in one embodiment, may be a computer which includes a memory and a processor. The server is configured to transmit, receive, process and store information or data associated with the environment. Various types of computers may be employed. For example, the computer may be a mainframe, workstation, as well as other types of processing devices. The server may be adapted to execute any operating system. For example, the operating system of the server may be z/OS, Linux-Intel, Linux/390, UNIX, or Windows Server. Other types of operating systems may also be used. The server may also include or be communicatively coupled with a web server and/or a Simple Mail Transfer Protocol (SMTP) server.

Although the environment is illustrated with one server, it is understood that more than one server, such as a server pool, as well as computers other than servers, may be employed.

The memory of the server may include any memory or database module. The memory may be volatile or non-volatile types of memories, such as magnetic media, optical media, random access memory (RAM), read-only memory (ROM), removable media, or any other suitable local or remote memory component.

A client may be a local or remote computing device with, for example, local memory and a processor. The memory may include fixed and/or removable storage media such as a magnetic computer disk, CD-ROM, or other suitable media. Various types of processing devices may serve as a client. For example, the client may be a PC, tablet PC, workstation, network computer, kiosk or personal data assistant (PDA). Other types of processing devices may also be used. The processing devices may include a memory and a processor. Input and output devices may be provided for the processing device. The input device may be, for example, a keypad, touch screen, mouse, or other device that can accept information from a user. For example, a client may receive requests from a user using the input device. The output device may be a display to convey information to a user. Other types of input and output devices may also be useful. The clients can receive, transmit, process and store any appropriate data associated with the environment 100.

Client/server (C/S) applications may be provided in the environment. Generally, C/S applications include front end and back end portions. The front end portions are stored locally on the clients while the back end portions are located in the server. Various types of C/S applications may be provided in the environment. For example, C/S applications may include business applications as well as a communication application, such as an email application. For example, C/S business applications may include SAP Business Objects applications from SAP AG Other type of C/S business applications may also be useful.

A client may include a user interface for a user to interface with the environment for various purposes. In one embodiment, the user interface comprises a graphical user interface (GUI). A GUI may provide an efficient and user-friendly manner of presenting information or communicating with the environment. For example, a GUI may include a task menu as well as one or more panes for displaying information. Other types of user interfaces, such as command line interface (CLI), may also be useful. The type of user interface may depend on the type of application running on the client. For example, the front end portion may include a GUI to enable a user to interact with the back end portion to access data stored in the server.

Although the environment is shown with three clients and one server, it is understood that there may be any number of clients communicatively coupled to one or more servers. Additionally, other types of devices may be included. The clients may be local or external clients. Furthermore, "client" and "user" may be used interchangeably as appropriate without departing from the scope of this disclosure. For example, a client may be used by one or more users while a user may use one or more clients. As an illustration, a user may have a user account for an application, such as the email system. Any user may access the user's respective account from any client by performing an authentication or a login process, such as providing a user name and password.

Figure 2:
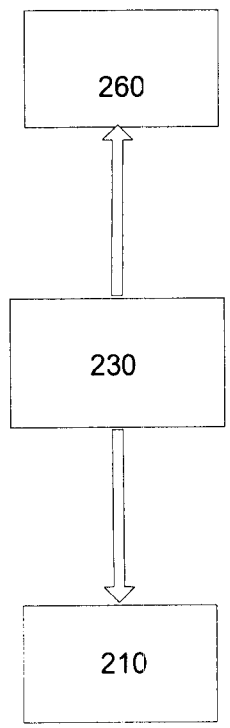
FIG. 2 shows an embodiment of a software environment.

FIG. 2 shows an embodiment of a software environment 200. As shown, the software environment includes an email system 210. Various types of email systems may be used. The email system, for example, is Microsoft Office Outlook provided by Microsoft Corporation. Other types of email systems, such as Lotus Notes from IBM, may also be used.

The software environment may include a software application 260. The software application can be any type of software application which cooperates with the email system. For example, the software application may generate files which can be sent to other users using the email system. The software application may be a collaborative application. Various types of collaborative applications may be used. In one embodiment, the software application may be Duet or Live Office from SAP AG. Other types of software applications may also be employed. The software application may be a suite of software applications. Although one email system and one software application are shown, the software environment may have more than one email system and software application.

In one embodiment, a workspace (Workspace) system 230 is provided. The Workspace system comprises, in one embodiment, an intelligent Workspace system. The Workspace system maintains one or more workspaces. A workspace is based on a topic, for example, on which a group of participants is involved.

The Workspace system organizes information of a topic into a workspace. For example, the Workspace system organizes emails, attachments, tasks, meeting requests as well as other documents, including any communications or information, related to the topic into the workspace. By maintaining all related information of a topic in a workspace, participants will be ensured of having the same information, including context by accessing the workspace. Also, the information is the most current and up-to-date information.

In one embodiment, the Workspace system includes intelligence to recommend one or more related workspaces to participants of a workspace. For example, participants of a first workspace may be recommended to other related workspaces. Additional relevant information may be provided from users outside of the workspace group. As such, providing recommendations of other workspaces can facilitate greater efficiency in the overall collaborative process.

The Workspace system may be implemented natively as part of the email system. In alternative embodiments, the Workspace system may be implemented as an add-on feature of the email system. Other configurations of the Workspace system may also be useful. The Workspace system enables creation of a workspace or accessing the workspace from within the email system. In other embodiments, the Workspace system can be accessed separately or from the software application. This provides flexibility and convenience in accessing the Workspace system.

Figure 3:
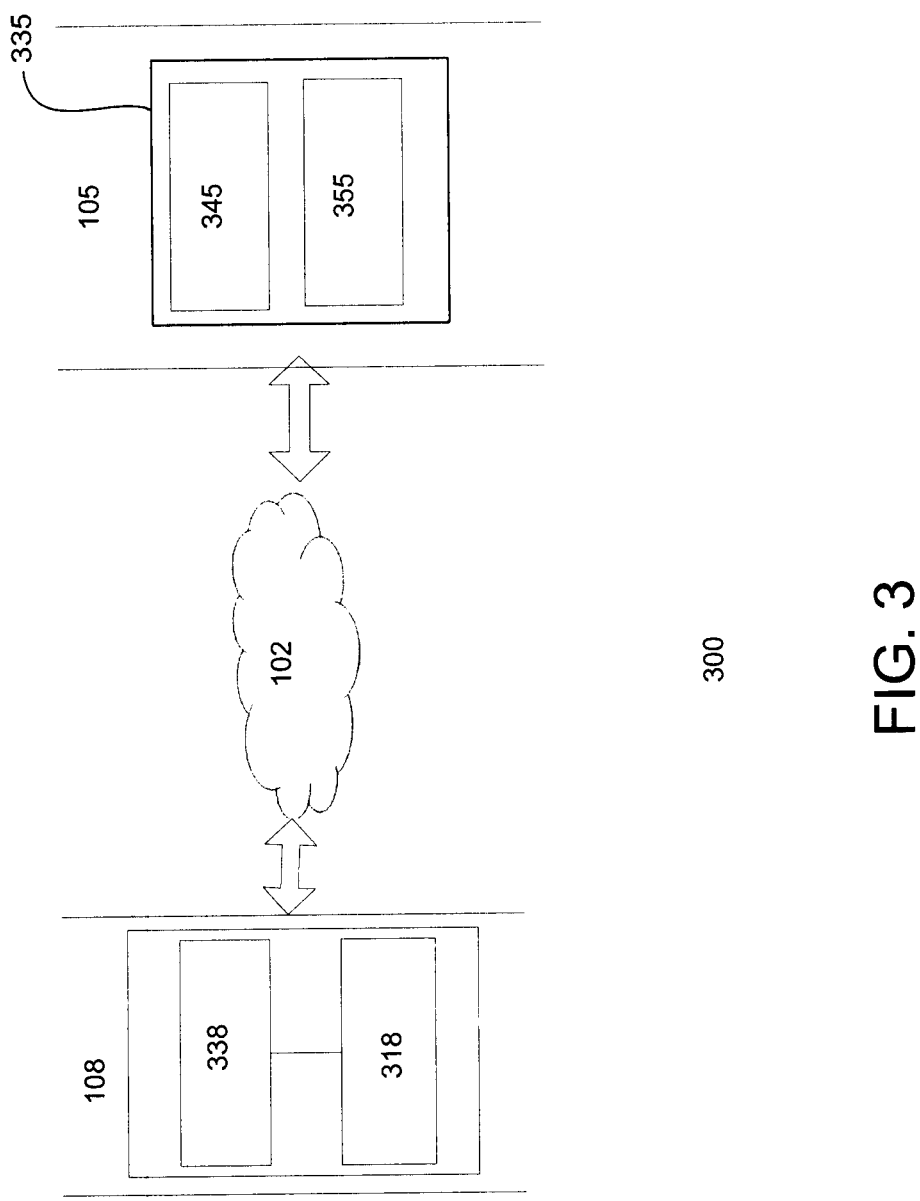
FIG. 3 shows an embodiment of a workspace system.

FIG. 3 shows an overview of an embodiment of a Workspace system 300. The system is based on a C/S architecture. A client 108 communicates with a server 105 via a communication network 102. The client includes a front end portion of the Workspace system 338. The front end portion of the Workspace system may be referred to as the Workspace client. The Workspace client includes a workspace interface, for example, a workspace GUI. The client may also include a front end portion of an email system 318 or an email client. The email client includes an email interface, for example, an email GUI.

In one embodiment, the workspace GUI is integrated with the email GUI. This enables the Workspace client to be initiated from within the email client. In other embodiments, the Workspace client may be initiated outside of the email client. For example, the Workspace client may be initiated separately or from within other applications. Other configurations of the Workspace client may also be useful. In a preferred embodiment, the Workspace client may be initiated at least from within the email client. The ability to initiate the Workspace client from within the email client allows a user to access the Workspace client without leaving the email client.

The server includes a back end portion of the Workspace system 335 which may be referred to as a Workspace server. As shown, the server may be a dedicated or standalone server for the Workspace system. In other embodiments, the server may also include a back end portion of the email system or email server (not shown). In such configuration, the Workspace server is integrated into the email server.

In one embodiment, the Workspace server includes a Workspace repository module 345 and a Workspace management module 355. The Workspace repository module stores information related to the different workspaces of the Workspace system. Information stored in the database may be associated with a unique index. The information may be mapped using the indexes. For example, database tables may be used to map the indexes to workspaces. Other forms of mapping information to the workspaces may also be useful. The Workspace management module controls the access rights of each workspace and determines workspace relationships, if applicable.

Figure 4:
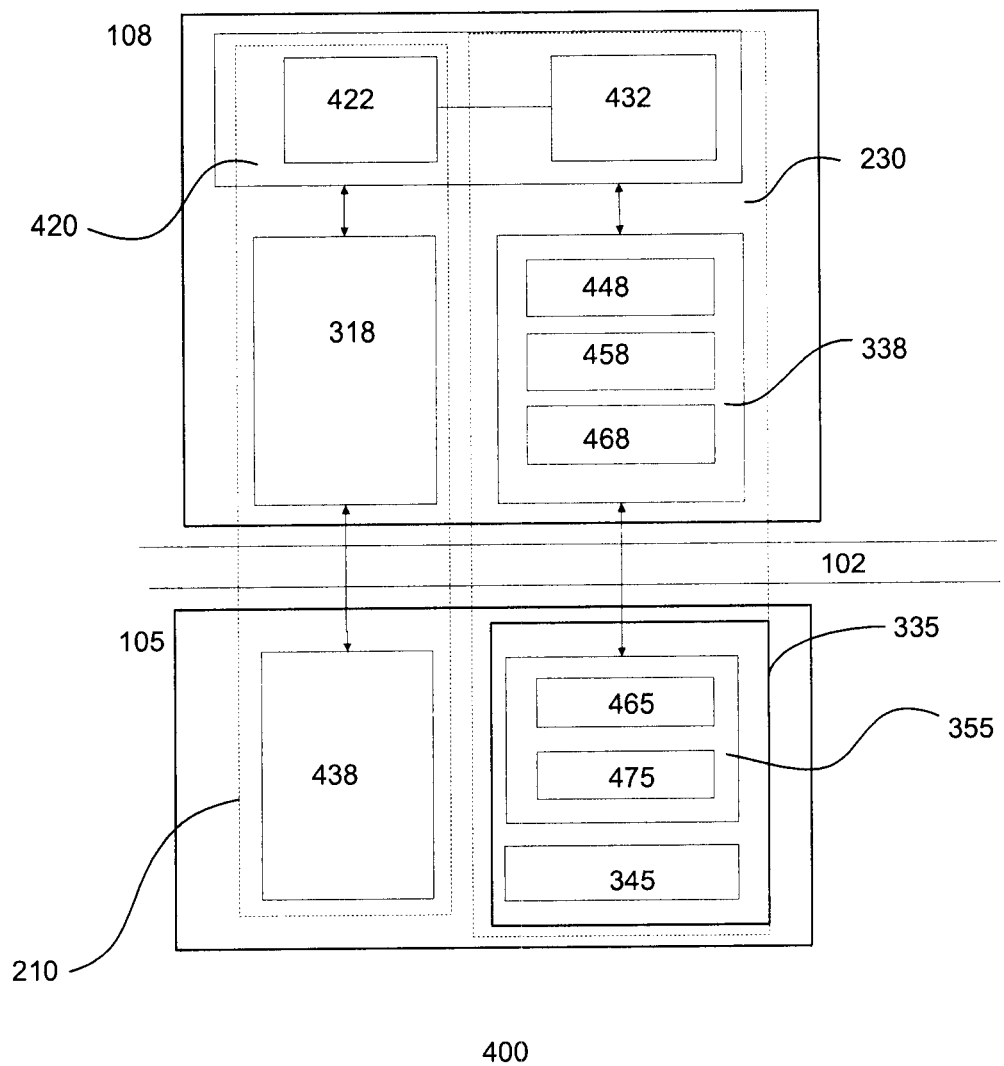
FIG. 4 shows architecture of an embodiment of a workspace system.

FIG. 4 shows the architecture 400 of an embodiment of a Workspace system. In one embodiment, the Workspace system comprises a C/S architecture. The Workspace system 230 comprises a front end portion of Workspace client 338 residing locally on a client 108 and a back end portion of Workspace server 335 residing on a server 105. The client communicates with the server via a communication network 102.

In one embodiment, the Workspace system cooperates with an email system 210. The Workspace system may be native to the email system. In some embodiments, the Workspace system may be an add-on or plug-in module of the email system.

A front end portion of email client 318 of the email system is located in the client. The email client, for example, enables a user to communicate with others using a digital message or email. An email may include a message header and a message body. The message header contains, for example, control information, such as originator's email address, and one or more recipient addresses and a subject header field. The message header may also include information generated automatically by the email client. For example, the email client may automatically generate date and message identification (message-ID) information. Attachments may also be provided with attachment identification (attachment-ID). The message body contains the content of the message.

A back end portion of email server 438, in one embodiment, of the email system is located in the server. As shown, the email server is located in the server with the back end portion of the Workspace system. As shown, the Workspace server is integrated with the email server. In other embodiments, stand alone email and Workspace servers may be provided. Other configurations of email and Workspace servers may also be employed.

To facilitate accessing the software applications or systems, one or more user interfaces are provided. The user interface, for example, provides access to front end portions of the software applications or systems locally on the client to interact with the back end portions on the server. In one embodiment, an email user interface 422 provides access to the email system and a workspace user interface 432 provides access to the Workspace systems. In one embodiment, the workspace user interface is provided within the email user interface to form an integrated user interface or GUI 420. The integrated user interface enables access to both the email and Workspace systems.

The user interface, in one embodiment, comprises a GUI interface. The GUI interface may comprise a plurality of customizable frames or views having interactive fields, pull-down lists and buttons operated by the user. The GUI may be configured to present information associated with queries, including buttons, which enable users to easily and efficiently make requests as well as receiving requested information. For example, the email GUI may include a panel for the workspace GUI.

In other embodiments, separate user interfaces may be provided to individually access the email and Workspace systems. Other configurations of user interfaces may also be useful. For example, user interfaces may be configured to enable access of the Workspace system from other software applications or systems. In yet other embodiments, other types of user interfaces may be provided.

A user may initiate the email GUI and perform an email user authentication process to access the user's email account. The email user authentication process includes, for example, entering the username and password of the user. Once authenticated, the user has access to the email system. The user may view his messages through the GUI.

In one embodiment, the workspace GUI panel includes an authentication pane. The workspace GUI panel, for example, may be a part of the email GUI panel. To access the Workspace system, a user performs a workspace user authentication process. For example, the user enters his username and associated password. The authentication process of the Workspace system may be the same as that of the email system. For example, once a user performs an authentication process for the email system, it automatically authenticates the user for the Workspace system. In other embodiments, separate authentication processes are provided for the email and Workspace systems. Other configurations of authentication or login processes for the email and Workspace systems may also be useful.

In one embodiment, the front end portion of the Workspace system may include a workspace builder module 448. The workspace builder is used to generate new workspaces by the user. For example, a user may desire to create a new topic for discussion. The user, through the workspace user interface, may generate a new workspace related to the new topic. When a new workspace is created, the workspace builder queries the creator for information, such as a description of the workspace. Additional information queried by the workspace builder may include, for example, security level of the workspace and workspace participants.

Generally, the creator of the workspace is the owner of the workspace. In some cases, ownership of the workspace may be delegated to another user by the creator. The owner, for example, manages the workspace. This may include managing workspace context, security level or tag and workspace participants. Other types of workspace information may also be managed by the owner. The workspace context, for example, may include background information of the workspace, attachments, email threads, meeting requests and meeting agendas. The workspace may also include other types of information related to the workspace.

In one embodiment, different types of security levels may be associated with a workspace. The security level determines the accessibility of the workspace. The security level can be defined by the owner using flags. Other techniques for defining the security level of a workspace may also be useful. A workspace may be associated, for example, with one of three security levels, such as public, private and secret. Table 1 shows an example of various attributes which may be associated with the different security levels. Providing other configurations of security levels and attributes may also be useful.

TABLE 1

| Security level | Accessibility |
|---|---|
| Public | Any user |
| Private | By invitation from owner |
| Secret | By invitation from owner and password assigned by owner |

The front end portion includes a workspace container module 458. The workspace container module contains all workspaces related to the user. For example, the workspace container module contains a list of public workspaces and those of which the user is a participant. The information may be stored locally in the client device and updated when the Workspace system is accessed.

The Workspace client, in one embodiment, comprises a workspace information extractor module 468. The workspace information extractor module extracts information from, for example, context. For example, information related to context is extracted when created in the Workspace system. The information extracted from the context may include information used to associate the context to a workspace. Information extracted, in one embodiment, may include message-ID, attachment-ID, workspace identifier (workspace-ID). Other types of information may also be extracted. For example, recipients of the context as well as other information to associate the context to the workspace. The information may be used to create an index or database table. Other techniques for associating information with a workspace may also be useful.

In some cases, context may be associated with more than one workspace. When context is associated with more than one workspace, the workspaces may be considered related workspaces.

In one embodiment, the Workspace server comprises a workspace repository module 345. The workspace repository module stores all information related to all the workspaces of the system. Workspaces can be created by different users and have different groups of overlapping participants. A Workspace management module 355 is included in the Workspace server. In one embodiment, the workspace management module comprises a workspace index engine 475. The workspace index engine creates an index of workspaces and related information stored in the workspace repository. For example, a database index table may be created. The database index table stores indexes associating information with one or more workspaces. Indexing enables rapid and efficient retrieval of information from the workspace repository.

The workspace management module, in one embodiment, includes a workspace suggestion engine 465. The workspace suggestion engine may recommend related workspaces to a participant. For example, a first workspace is related to a first topic. The workspace suggestion engine identifies a second workspace having a second topic which is similar or related to the first topic. Other types of relationships may include workspaces having the same emails or attachments. The workspace suggestion engine would suggest to participants of the first workspace to possibly join the second workspace and vice-versa. In one embodiment, the workspace suggestion engine suggests related workspaces which are public workspaces. In other embodiments, private or higher security level workspaces may also be suggested with prior authorization from the owner.

Figure 5:
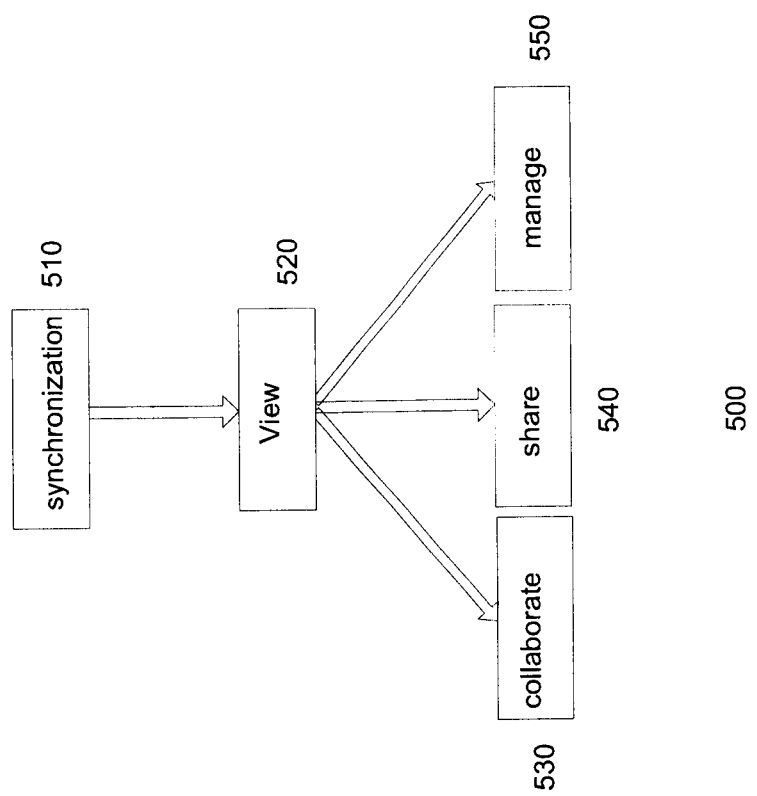
FIG. 5 shows an embodiment of an overall flow of a workspace system.

FIG. 5 shows an embodiment of an overall flow 500 of a workspace system. At step 510, a user performs an authentication process to access the Workspace system at a client. For example, a user accesses the Workspace client and performs a login process via a GUI. This may include the user entering the username of the account and password. In one embodiment, the workspace GUI is integrated with the GUI of the email client. The login process to the workspace system may be integrated with the login process of the email system. For example, access to the email system automatically accesses the Workspace system. In alternative embodiments, a separate login process may be provided for the workspace system. Logging in connects the Workspace client to the Workspace server.

The Workspace client synchronizes workspace information from the Workspace server. For example, the Workspace server updates the Workspace client with information which includes a list of available workspaces. Available workspaces are, for example, workspaces which can be viewed by the user. This may include public workspaces and workspaces of which the user is a participant. The Workspace server may provide additional information to the user. While logged in, the Workspace server may provide notifications of any updates which may be available to the user. For example, notifications of new workspaces or updates on existing workspaces may be provided to the user. Other workspace information may also be displayed. The workspace information may be displayed in the workspace GUI at step 520. For example, the user may view available workspaces displayed in the workspace GUI.

Access to the Workspace system provides the user with various options. Using the workspace GUI, a user may collaborate with other users by selecting an available workspace at step 530, create a new workspace related to a topic at step 540 or manage a workspace at step 550. Managing a workspace, in one embodiment, is reserved for the owner of the workspace. Managing a workspace may include, for example, deleting the workspace, reclassifying the workspace security level, removing participants, adding participants as well as other administrative functions.

Figure 6:
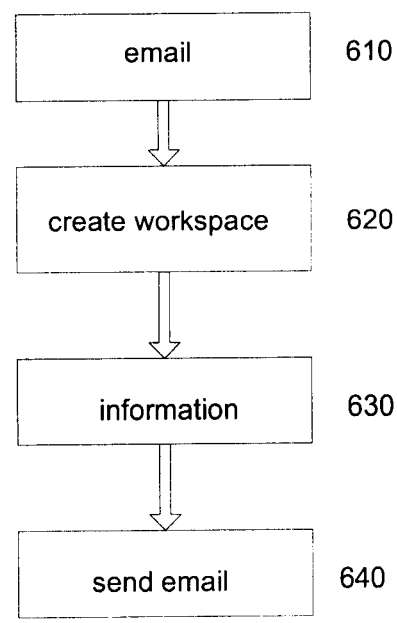
FIG. 6 shows an embodiment of a process flow for creating a workspace.

FIG. 6 shows an embodiment of a process flow 600 for creating a workspace for sharing information using the Workspace system. At step 610, a user may be in an email communication. The email communication may be created or responded by the user. The email communication may be any type of email communication. For example, the communication may be an email, task or a meeting request. Other types of email communications may also be useful.

The user, at step 620, may desire to create a new workspace in the Workspace system to share information. For example, the user may desire to share information related to the email communication. To create a new workspace, the user may select a "create new workspace (CNW)" action button in the workspace GUI. The CNW action button may be located in an action pane of the workspace GUI panel. Other techniques may be employed to create a new workspace.

When a new workspace is created, the Workspace system queries the user for information related to the new workspace. In one embodiment, the Workspace system queries the user for a description and title of the new workspace. The Workspace may further query the user for invitees of the new workspace. Alternatively or in addition, invitees or participants of the workspace may be extracted from the recipient list of an existing email communication. Other types of information may also be requested from the creator of the new workspace. For example, workspace context, such as attachments, meeting requests, tasks and existing email threads, may be requested from the creator. The information related to the workspace may be, for example, stored locally at the workspace client.

At step 630, the user may include one or more attachments with the email communication. The attachment may be any type of documents which is attached to the email communication. The attachment, for example, may be reports, pictures, articles or other types of files. To complete creating the new workspace, the user sends the email communication to the recipients at step 640.

Once the communication is sent, the information of the workspace is stored in the workspace server. The workspace server may analyze the workspace information to identify related workspaces. Related workspaces are stored in, for example, a relationship map.

Figure 7:
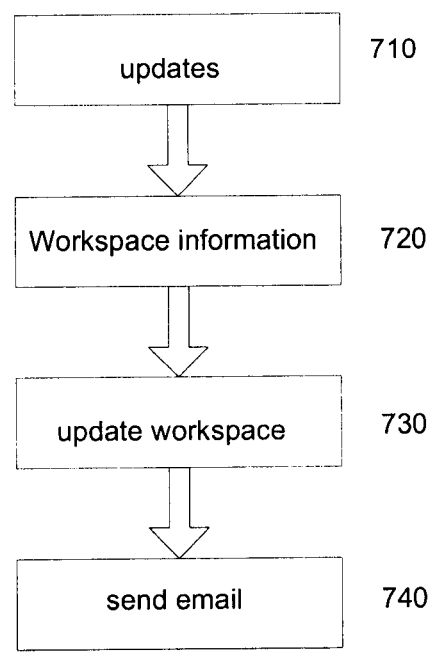
FIG. 7 shows an embodiment of a process flow for collaborating with other users via a workspace system.

FIG. 7 shows an embodiment of a process flow 700 for collaborating with other users via the Workspace system. At step 710, a user receives workspace updates from the Workspace server. For example, the user receives an updated list of available workspaces. The updated list of available workspaces may be displayed on the workspace GUI. For example, a list of workspaces may be displayed on a workspace list pane of the workspace GUI panel.

The user may select a workspace from the list of workspaces to collaborate at step 720. The user may select the workspace by, for example, clicking on the workspace of interest in the workspace list panel. Information related to the selected workspace will be displayed. For example, emails, calendar of meetings, tasks, attachments or contexts, and participants may be displayed in the workspace GUI. The different types of information may be provided in its respective categories or panes in the GUI panel. To access any information, a user may click on a desired item in the workspace. This ensures that the user is provided or has access to the most updated information related to the workspace.

At step 730, the user may decide to update the selected workspace with new information. In one embodiment, updating information to the workspace is achieved by generating an email communication at step 740. The email may include a message as well as context. For example, the user may attach one or more documents, such as reports or pictures to the email.

After the email is generated, a user may add the email communication to the selected workspace. For example, an action button, such as an "add email" action button, may be provided in the workspace GUI. By clicking or selecting the "add email" action button, the email is added to the selected workspace. Adding the email to the workspace causes, for example, the workspace information extractor to extract relevant information from the email communication.

In one embodiment, adding the email communication to a workspace may automatically add participants of the workspace to the recipient field of the email. Manually adding recipients or a combination of automatic and manual selection of recipients for the email communication may also be useful. The user then sends the email communication to the participants of the workspace. The sent email communication will be added to the workspace in the Workspace server.

In other embodiments, the workspace can be updated directly from the Workspace system. For example, a user may access the Workspace client and update information to a workspace directly. The updated information would be placed into the Workspace server. The Workspace server may send out the updated information to the participants of the workspace. Other techniques for updating a workspace may also be useful.

Figure 8:
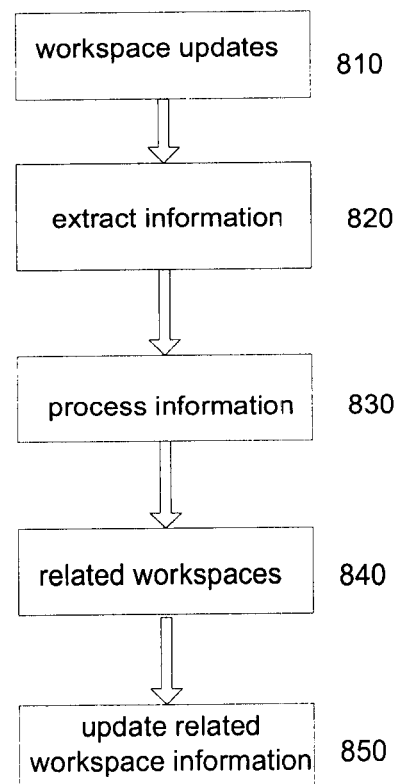
FIG. 8 shows an embodiment of a process flow for suggesting a workspace.

FIG. 8 shows an embodiment of a process flow 800 for suggesting related workspaces by the Workspace system. At step 810, the Workspace system receives information for updating. For instance, when an email communication is sent out from a user using the Workspace system, the email communication is stored in the Workspace server. The communication may be stored in the workspace repository.

Information from the email communication is extracted by the Workspace system at step 820. In one embodiment, the extracted information includes lists of recipients, context and the workspace of interest (e.g., workspace of the communication). Other types of information may also be extracted.

At step 830, the extracted information is processed by the Workspace server. In one embodiment, the extracted information is processed by a workspace suggestion engine. Based on the extracted information, the workspace suggestion engine determines workspaces which are related to the workspace of interest.

A related workspace is a workspace which has a relationship with the workspace of interest. In one embodiment, a relationship may be determined by common factors between a workspace and a workspace of interest. In one embodiment, a workspace is related to a workspace of interest if both workspaces have related emails, such as emails with the same history, or common email attachments. Other factors may also be employed to determine a relationship between workspaces. For example, a relationship may be established based on common users, such as a user level relationship.

In one embodiment, the workspace suggestion engine identifies related workspaces using a workspace level and an email level relationship. In the workspace level relationship, workspaces are related if they have related emails. Related emails having the same history, for example, include emails which are copies as a result of being forwarded from one workspace to another workspace. In the email level relationship, workspaces are related if they have emails which have the same document as an attachment. Documents may be identified by a document identifier. Other techniques for identifying a document may also be useful.

The workspace generates related workspace information at step 840. The related workspace information is updated in the workspace of interest at step 850. The related workspace information may be listed in a related workspace panel of the workspace GUI. In one embodiment, the related workspaces based on the workspace level relationship are listed with higher priority than related workspaces based on email level relationship. Within each category, they may be prioritized based on closeness of the relationship. For example, those workspaces having more common emails or common documents may be listed with higher priority. Other listing arrangements of related workspaces may also be useful.

Figure 9A:
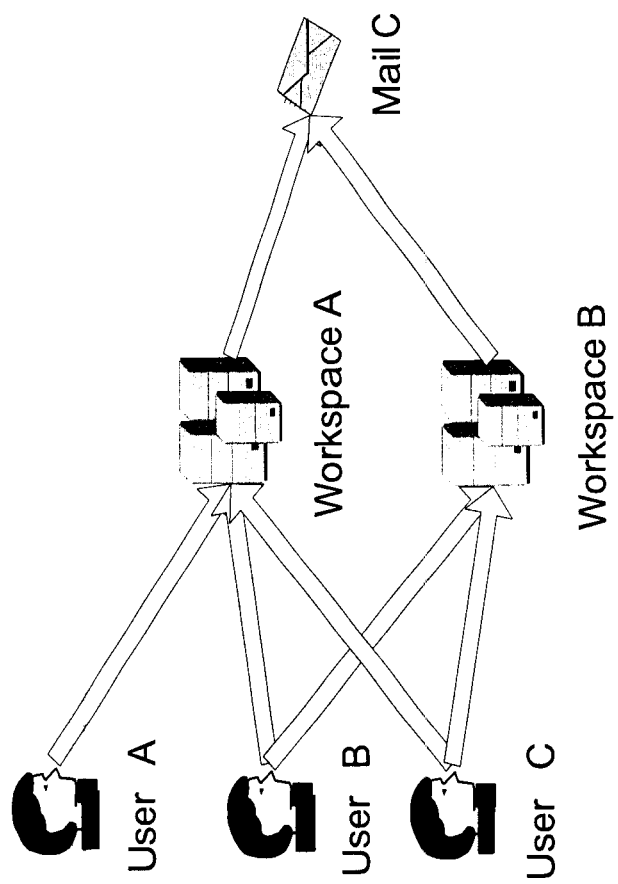
FIG. 9a shows an exemplary workspace level relationship.

FIG. 9a illustrates an example of a workspace level relationship 910 in accordance with an embodiment of a workspace suggestion engine. As shown, User A is a participant of Workspace A; User C is a participant of Workspace B. User B, on the other hand, is a participant of both Workspaces A and B. Both Workspace A and Workspace B have a relationship with Mail C. Due to related Mail C, the workspace suggestion engine determines that Workspace A and Workspace B have a workspace level relationship.

In some cases, the workspace level relationship may be determined if both Workspace A and Workspace B contain emails having the same history. Emails may contain the same history if they are copies of each other or contain at least one common thread. For example, Workspace A contains Mail C and Workspace B contains Mail D which is a copy of Mail C. Workspace B may have obtained Mail D as a result of, for example, User B forwarding Mail C to User C through Workspace C.

Once a workspace level relationship is identified, the workspace suggestion engine suggests Workspace A to participants of Workspace B and Workspace B to participants of Workspace A.

Figure 9B:
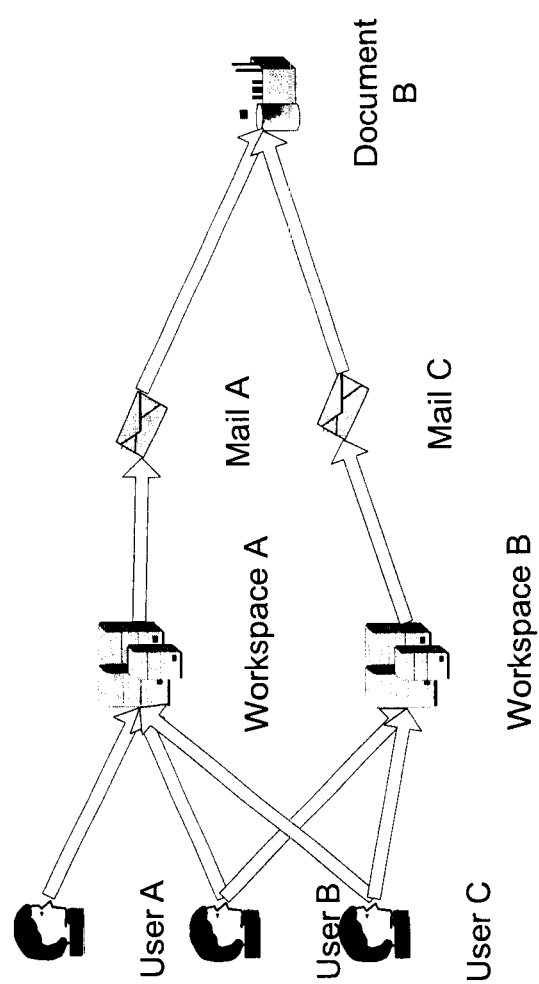
FIG. 9b shows an exemplary email level relationship.

FIG. 9b illustrates an example of an email level relationship 920 in accordance with an embodiment of a workspace suggestion engine. Similar to FIG. 9a, User A is a participant of Workspace A, User C is a participant of both Workspaces A and B and User B is a participant of both Workspaces A and B. Workspace A contains Mail A and Workspace B contains Mail C. Both Mail A and Mail C contain Document B as an attachment. Since both Mails contain the same attachment, the workspace suggestion engine identifies that Workspaces A and B have an email level relationship. Once the email level relationship is identified, the workspace suggestion engine suggests Workspace A to participants of Workspace B and Workspace B to participants of Workspace A.

Figure 10:
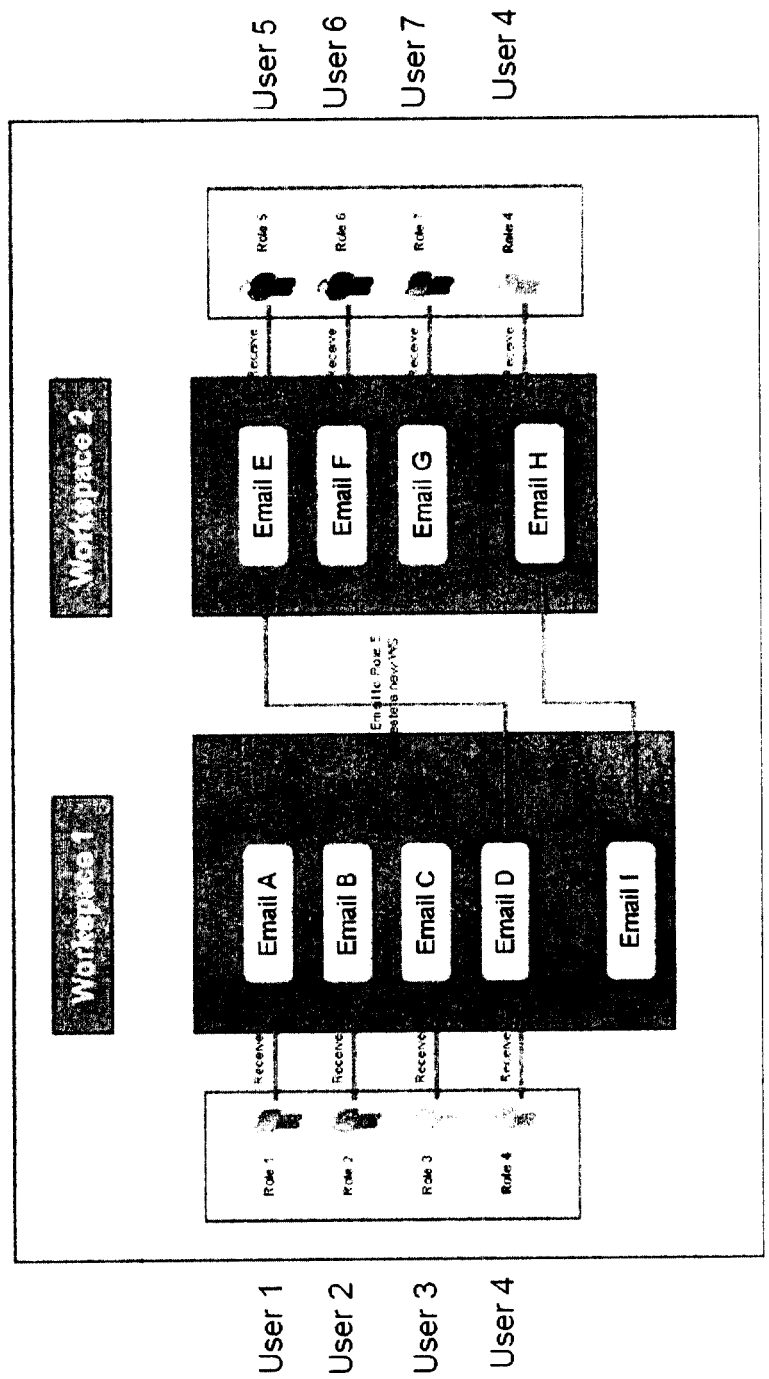
FIG. 10 shows an example of collaboration using a workspace system.

FIG. 10 shows an example 1000 of a collaboration using the Workspace system. As shown, Workspace 1 which is related to a first topic exists in the Workspace system. Users 1-4 are participants of Workspace 1. The topic of Workspace 1, for example, may be to discuss an issue related to the economic recession. Email communications may be exchanged between Users 1-4 of Workspace 1. As shown, User 1 creates Email A, User 2 creates Email B, User 3 creates Email C and User 4 creates Email D. Emails A-D are exchanged between Users 1-4.

During a collaboration, an issue may arise. For example, Users 1-4 of Workspace 1 decide that a task needs to be performed. The task may be generating an analytical report. However, none of the users of Workspace 1 are capable of generating such a report. User 4 decides to create a new Workspace 2 for the purpose of resolving the issue of generating an analytical report. To create Workspace 2, User 4 generates an email communication, for example, forwarding Email D to Users 5-7. Users 4-7 now become participants of Workspace 2.

Emails may be exchanged between Users 4-7 of Workspace 2 related to generating the analytical report. For example, Emails E-H may be exchanged among Users 4-7. When the report is generated, it is exchanged among the Users of Workspace 2. For example, the analytical report may be included as an attachment in Email H. User 4 may forward Email H to one or more Users of Workspace 1. The forwarded email communication becomes Email I in Workspace 1. As such, Users 1-4 have now resolved the issue to enable Workspace 1 to continue to collaborate.

Furthermore, due to Workspaces 1 and 2 containing an email communication having the same history, they are related by an email relationship. Users of one workspace may be suggested to join the other related workspace.

The Workspace system may be embodied as an application. For example, the Workspace system may be embodied as a software application. The application may be native to an existing software application or as an add-on or plug-in to an existing application. The existing software application may be a suite of software applications. The source code of the Workspace system may be compiled to create an executable code. The codes of the Workspace system, for example, may be stored in a storage medium, such as a storage disk. Other types of storage media may also be useful.

Figure 11A:
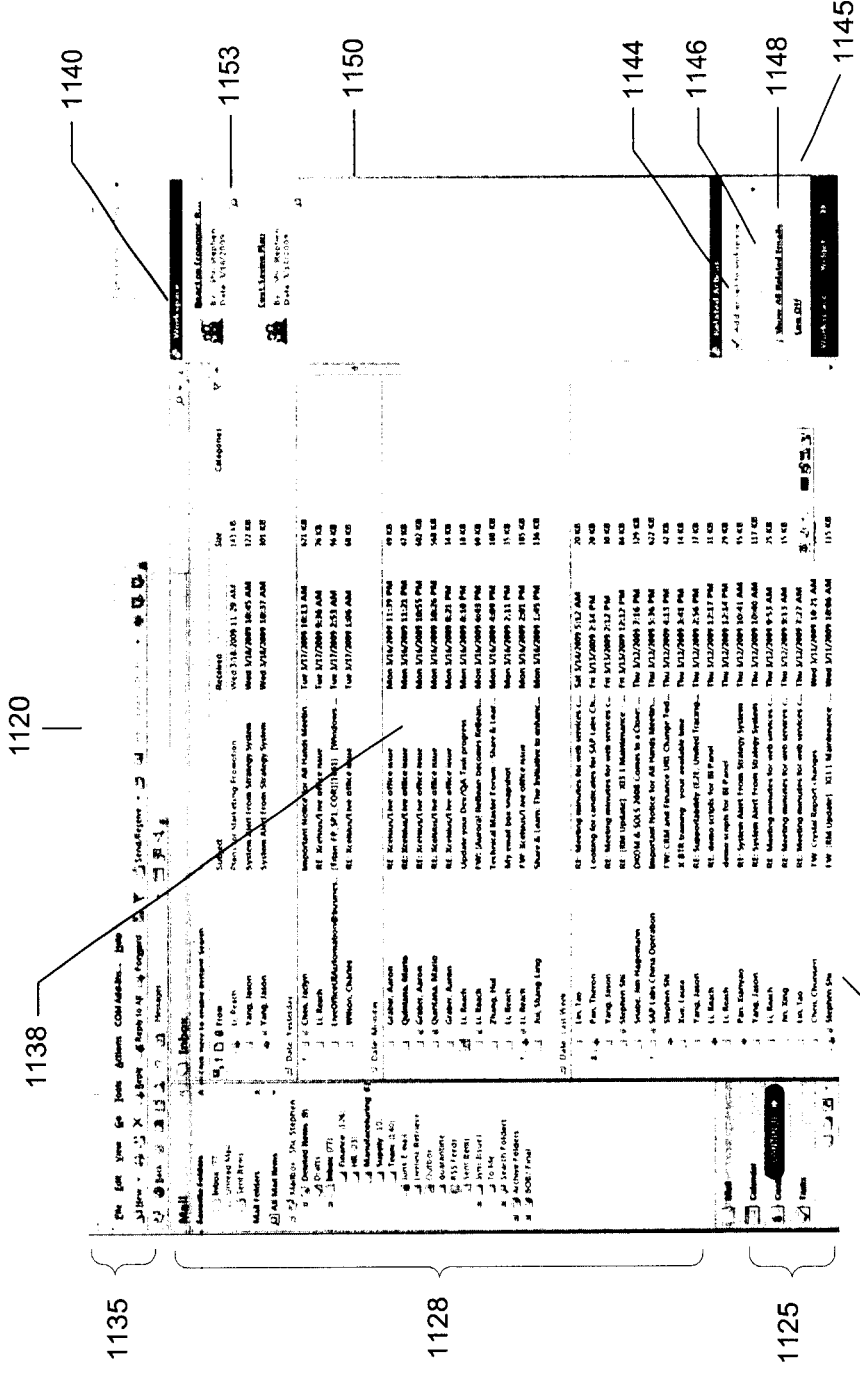
Figure 11B:
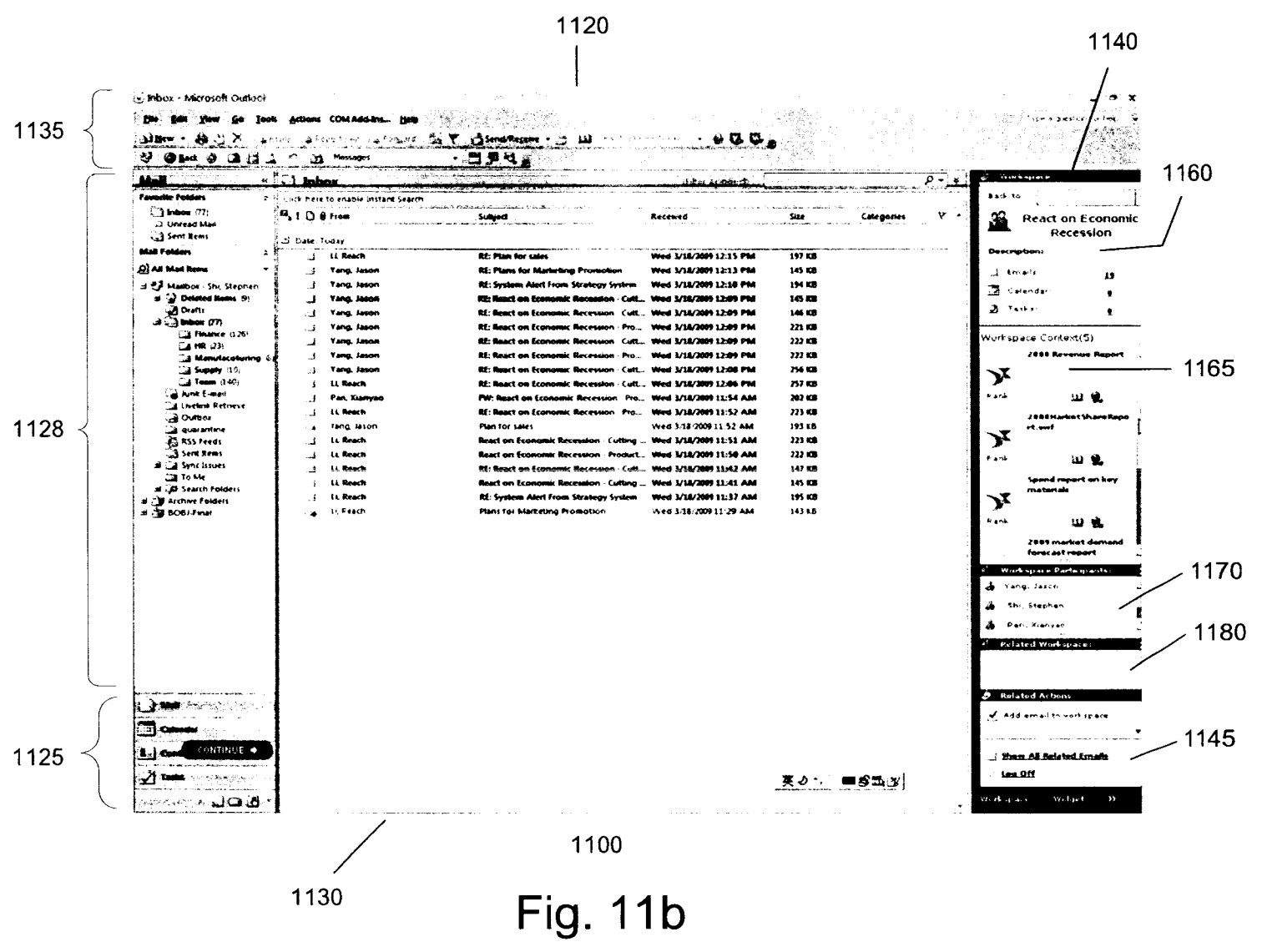

FIGS. 11a-b show examples of a GUI 1100 for accessing a Workspace system. The GUI, in one embodiment, includes a workspace GUI panel 1140 and an email GUI panel 1120. As shown, the workspace GUI panel is displayed within the email GUI panel. For example, the workspace GUI panel is located on a right portion of the email GUI panel. Locating the workspace GUI panel in other parts of the email GUI panel may also be useful.

The email GUI panel, for example, is an email GUI of Microsoft Outlook. In other embodiments, other types of email systems may also be employed. The email panel may include different panes. For example, the email panel may include a functional pane 1125 for selecting different functions, such as mail, calendar, contacts and tasks. One or more display panes 1128 and 1130 may be provided. The display panes display information related to the selected function. A first pane 1128 may display categories of items related to the selected function while a second pane 1130 displays detail information of the selected category. For example, in the mail function, selecting inbox in the first pane would cause received messages of the user to be displayed in the second pane. One or more menu bars 1135 may be displayed, for example, on the top of the email pane to perform various functions.

Referring to FIG. 11a, the workspace GUI panel includes a workspace list pane 1150 and a related action pane 1145. These panes, for example, are displayed in the workspace GUI panel after a user has performed the user authentication process. The workspace list pane displays the available workspaces in the Workspace system. As shown, the user has two available workspaces. Each workspace may be represented by an icon. Text may be provided to indicate the owner and describe the workspace. Additionally, adjacent to each workspace is a "show email" button 1153. Displaying the workspaces in other formats may also be useful.

A user may select to display information related to a workspace within the list of workspaces. To show emails of a workspace, the user may click on the "show email" button 1153 of the workspace. This causes the Workspace system to filter the emails in the workspace repository. In one embodiment, the emails of the workspace are displayed in the second pane of the email GUI panel.

The action pane includes various actions which can be performed by the Workspace system. In one embodiment, the action pane includes an add email to workspace action 1144. Selecting this action causes a selected email 1138 to be added to a selected workspace. In the case where no workspace is selected, selecting the add email to workspace causes the workspace client to query the user to select a workspace. The action pane may also include a show all related emails action 1148. Emails related to a selected email are shown when this action is selected. Other actions, such as log off and a search function may also be provided in the related action pane.

In one embodiment, an action box 1146 is provided. The action box includes, for example, a pull down menu of action items, such as a create new workspace action. Selecting the create new workspace action causes a new workspace to be created. The Workspace client queries the user for information, such as a description and title of the new workspace. An email may be added to the newly created workspace by selecting the add email to workspace action.

Referring to FIG. 11*b*, when a workspace is selected, the workspace GUI panel shows a description pane 1160. The description pane describes the basic information of the selected workspace. In one embodiment, the basic information includes the title and a description of the workspace. Additionally, the amount of different items of information contained in the workspace is also provided. For example, the amount of emails, meetings and tasks related to the selected workspace are provided in the description pane. Clicking on an item causes the selected item to be displayed in, for example, the email display pane 1130. For example, clicking on the email item causes the emails of the workspace to be displayed. For example, the 19 emails of the selected workspace are shown. Providing additional items in the description pane may also be useful.

The workspace GUI panel also includes a context pane 1165. The context pane displays the different attachments in the emails of the selected workspace. The attachments, for example, may be reports generated related to the topic of the workspace. Other types of attachments, such as, documents, pictures as well as other files may also be displayed. The context pane provides a central location to access attachments without having to access the email. In some embodiments, an attachment may also include an indicator indicating the associated email.

Additional panes may also be provided in the workspace GUI panel. For example, a participant pane 1170 and related workspace pane 1180. The participant pane displays the participants of the workspace and the related workspace pane displays related workspaces as identified by the workspace suggestion engine. A user may switch to a related workspace by clicking on a workspace in the related workspace pane. The related action pane 1145 may also be included in the workspace GUI panel.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of collaborating on a topic comprising:
   providing a workspace system for maintaining one or more collaborative workspaces by participants of the workspaces, wherein the workspace system organizes information related to a workspace topic, wherein information of a workspace comprises emails, attachments, tasks, meeting requests and documents and communications related to the workspace topic;
   generating an electronic communication;
   selecting a first workspace from a list of available collaborative workspaces, the first workspace is for collaboration by a first group of participants in the workspace system, the first workspace is created by a first user for collaborating on a first workspace topic of the first workspace;
   sending the electronic communication to the first group of participants of the first workspace for collaborating on the first workspace topic;
   storing the electronic communication in the workspace system, wherein the electronic communication is associated with the first workspace;
   determining a related workspace of the first workspace based on at least one of
      a workspace level relationship, wherein the related workspace based on the workspace level relationship comprises emails with the same history, and
      an email level relationship, wherein the related workspace based on the email level relationship comprises emails with the same attachment; and
   suggesting the related workspace to the first group of participants.

2. The method of claim 1 wherein:
   the workspace system is adapted to cooperate with an electronic communication system; and
   generating and sending the electronic communication comprises using the electronic communication system.

3. The method of claim 2 wherein the workspace system comprises a client/server architecture which comprises:
   a workspace client located at one or more local client devices; and
   a workspace server.

4. The method of claim 1 wherein all electronic communications from the first group of participants related to the first topic are stored in the first workspace.

5. The method of claim 4 wherein all electronic communications related to different workspaces are stored in the workspace system and are associated with their respective workspaces.

6. The method of claim 1 comprises:
   accessing the workspace system comprises accessing the workspace system through an electronic communication system (ECS) user interface at an electronic communication client, wherein the ECS user interface includes a workspace user interface.

7. The method of claim 6 comprises updating workspace information in the workspace user interface when the workspace system is accessed.

8. The method of claim 3 comprises creating a new workspace, wherein creating the new workspace includes:
   providing information related to the new workspace in the workspace client; and
   sending the information related to the new workspace to the workspace server.

9. The method of claim 8 wherein the information related to the new workspace comprises:
   a description of the new workspace;
   a title of the new workspace;
   defining a security level of the new workspace;
   defining participants of the new workspace; or
   a combination thereof.

10. A workspace system for collaboration comprising:
   a workspace client located at a client device, the workspace client includes a workspace user interface for accessing the workspace system, and a workspace builder module for creating a new workspace for collaborating on a new workspace topic; and a workspace server for providing a list of available workspaces with respective workspace topics for collaboration, wherein a workspace is created by a user for collaborating on a workspace topic, the workspace server includes a workspace repository for storing electronic communications associated with workspaces, a workspace index engine for creating index of information to associate the electronic communications to their respective workspaces, and a workspace suggestion engine for suggesting related workspaces of the workspace system to participants of the related workspaces based on a workspace level relationship, an email level relationship, or a combination thereof, wherein workspace level relationship comprises emails with the same history, and email level relationship comprises emails with the same attachment.

11. The workspace system of claim 10 comprises a plurality of workspace clients located at client devices.

12. The workspace system of claim 10 wherein the workspace client comprises a workspace information extractor module for extracting information of an electronic communication related to a workspace.

13. The workspace system of claim 10 is adapted to cooperate with an electronic communication system.

14. A computer usable medium having a computer readable program code tangibly embodied therein, the computer readable program adapted to be executed by a processor to implement a method for collaborating on a topic comprising:

cooperating with an electronic communication system;

maintaining one or more workspaces with respective workspace topics for collaboration;

selecting a workspace from a list of available workspaces, the workspace is created by a user for collaborating on a topic;

storing electronic communications associated with the selected workspace; and suggesting related workspaces to participants of the related workspaces based on a workspace level relationship, an email level relationship, or a combination thereof, wherein workspace level relationship comprises emails with the same history, and email level relationship comprises emails with the same attachment.

15. The computer usable medium of claim 14, wherein the computer readable program is further adapted to implement a workspace client which includes a workspace user interface for accessing the workspaces, and a workspace builder module for creating a new workspace for a new topic; and a workspace server for providing the list of available workspaces, the workspace server includes a workspace repository for storing the electronic communications related to the workspaces, a workspace index engine for creating index of information to associate the electronic communications to their respective workspaces, and a workspace suggestion engine for suggesting related workspaces of the workspace system based the workspace level relationship, the email level relationship, or a combination thereof, wherein related workspaces based on the workspace level relationship comprises emails with the same history and related workspaces based on the email level relationship comprises emails with the same attachment.

16. The computer usable medium of claim 15 wherein the workspace client is provided in a first computer usable medium and the workspace server is provided in a second computer usable medium.

17. The method of claim 1 wherein:

the first workspace includes a first email and the related workspace includes a second email;

the workspace level relationship is determined when the first and second emails comprises the same history; and the email level relationship is determined when the first email and the second email comprises the same attachment.

* * * * *